US010740823B1

(12) United States Patent
Barakat et al.

(10) Patent No.: US 10,740,823 B1
(45) Date of Patent: Aug. 11, 2020

(54) FINANCIAL ALERT SYSTEM BASED ON IMAGE OF USER SPENDING BEHAVIOR

(71) Applicant: Wells Fargo Bank, N.A., San Francisco, CA (US)

(72) Inventors: Wayne Barakat, Novato, CA (US); Thomas E. Gross, San Anselmo, CA (US); Darius Miranda, San Francisco, CA (US); Marria Wairmola Rhodriquez, San Francisco, CA (US); Andres J. Saenz, Redmond, WA (US); Sadie Salim, Albany, CA (US); Duc M. Trinh, Golden Valley, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 442 days.

(21) Appl. No.: 15/612,108

(22) Filed: Jun. 2, 2017

Related U.S. Application Data

(60) Provisional application No. 62/492,080, filed on Apr. 28, 2017.

(51) Int. Cl.
*G06T 7/00* (2017.01)
*G06Q 20/32* (2012.01)
*G06Q 30/06* (2012.01)
*H04L 29/08* (2006.01)
(Continued)

(52) U.S. Cl.
CPC ......... *G06Q 30/0631* (2013.01); *G06F 3/048* (2013.01); *G06Q 20/322* (2013.01); *G06Q 30/0282* (2013.01); *G06T 7/0002* (2013.01); *H04L 67/22* (2013.01)

(58) Field of Classification Search
CPC .......... G06Q 30/0631; G06Q 30/0282; G06Q 20/322; G06Q 30/60; H04L 67/22; G06T 7/0002
See application file for complete search history.

(56) References Cited

U.S. PATENT DOCUMENTS

| 5,530,438 A | * | 6/1996 | Bickham | ............ G06Q 20/206 235/380 |
| 5,591,949 A | * | 1/1997 | Bernstein | ............ G06Q 20/04 235/375 |

(Continued)

OTHER PUBLICATIONS

Khazan, Olga, This App Reads Your Emotions on Your Face The Atlantic, Jan. 15, 2014 (Year: 2014).*

(Continued)

*Primary Examiner* — Scott L Jarrett
(74) *Attorney, Agent, or Firm* — Foley & Lardner LLP

(57) ABSTRACT

A user mobile device includes a network interface, an input/output ("I/O") device configured to exchange data with a user, the I/O device including a display device configured to present a graphical user interface to the user, an imaging device configured to generate image data; and a processing circuit. The processing circuit comprising a memory and a processor. The memory stores instructions that cause the processor to receive, by at least one of the network interface, I/O device, and imaging device, data indicative of spending behavior of the user, generate a user spending alert based on the received data, the user spending alert including a user photograph, and present, via the display device, the user spending alert to the user.

18 Claims, 3 Drawing Sheets

(51) Int. Cl.
*G06Q 30/02* (2012.01)
*G06F 3/048* (2013.01)

(56) References Cited

U.S. PATENT DOCUMENTS

| | | | | |
|---|---|---|---|---|
| 5,708,422 | A * | 1/1998 | Blonder | G06Q 20/40 340/5.41 |
| 5,915,023 | A * | 6/1999 | Bernstein | G06Q 20/04 705/35 |
| 6,629,104 | B1 * | 9/2003 | Parulski | G06F 16/58 382/307 |
| 7,620,270 | B2 * | 11/2009 | Matraszek | G06K 9/6267 382/305 |
| 7,693,810 | B2 * | 4/2010 | Donoho | G06Q 40/00 705/35 |
| 7,764,311 | B2 * | 7/2010 | Bill | G10H 1/00 348/222.1 |
| 7,953,254 | B2 * | 5/2011 | Seo | H04N 21/44218 382/118 |
| 8,024,271 | B2 * | 9/2011 | Grant | G06Q 20/102 705/40 |
| 8,095,432 | B1 | 1/2012 | Berman et al. | |
| 8,259,992 | B2 * | 9/2012 | Basson | G10L 19/167 382/100 |
| 8,396,808 | B2 * | 3/2013 | Greenspan | G06Q 20/10 705/64 |
| 8,458,041 | B1 * | 6/2013 | Jakobsson | G06Q 30/06 705/26.1 |
| 8,682,793 | B2 * | 3/2014 | Carlson | G06Q 20/04 235/380 |
| 8,690,054 | B1 * | 4/2014 | Cummins | G06Q 30/06 235/379 |
| 8,868,680 | B2 | 10/2014 | Gupta et al. | |
| 9,282,138 | B2 * | 3/2016 | Grewal | H04L 67/306 |
| 9,288,285 | B2 | 3/2016 | Li et al. | |
| 9,336,268 | B1 * | 5/2016 | Moudy | G06F 40/30 |
| 9,396,492 | B2 | 7/2016 | Schiff et al. | |
| 9,413,793 | B2 * | 8/2016 | Cheng | G06Q 10/06 |
| 9,477,973 | B2 * | 10/2016 | Duponchel | G06Q 30/0269 |
| 9,639,838 | B2 * | 5/2017 | McNelley | G06Q 20/401 |
| 9,727,910 | B1 * | 8/2017 | Wu | G06Q 40/02 |
| 10,069,971 | B1 * | 9/2018 | Shaw | H04M 3/5133 |
| 10,083,358 | B1 * | 9/2018 | Shin | G06K 9/00295 |
| 10,248,851 | B2 * | 4/2019 | Movellan | G06K 9/00302 |
| 10,523,991 | B2 * | 12/2019 | Wexler | G06F 16/9535 |
| 10,558,740 | B1 * | 2/2020 | O'Malley | G06F 40/197 |
| 2002/0152166 | A1 * | 10/2002 | Dutta | G06Q 20/04 705/43 |
| 2003/0108241 | A1 * | 6/2003 | Colmenarez | H04N 1/00127 382/181 |
| 2004/0024709 | A1 * | 2/2004 | Yu | G06Q 20/105 705/43 |
| 2004/0101212 | A1 * | 5/2004 | Fedorovskaya | G06K 9/6293 382/305 |
| 2005/0136918 | A1 * | 6/2005 | Kakatsakis | H04M 15/745 455/432.3 |
| 2006/0089908 | A1 * | 4/2006 | Keohane | G06Q 20/1085 705/43 |
| 2007/0214039 | A1 * | 9/2007 | Hoyt | G06Q 30/02 705/14.72 |
| 2007/0244830 | A1 * | 10/2007 | Hilderman | G06Q 20/20 705/67 |
| 2007/0288373 | A1 * | 12/2007 | Wilkes | G06Q 20/108 705/42 |
| 2008/0010203 | A1 * | 1/2008 | Grant | G06Q 20/102 705/44 |
| 2008/0209223 | A1 * | 8/2008 | Nandy | G06F 21/36 713/185 |
| 2009/0307168 | A1 * | 12/2009 | Bockius | G06F 16/9535 706/46 |
| 2011/0208588 | A1 * | 8/2011 | Joa | G06O 30/0258 705/14.56 |
| 2011/0295731 | A1 * | 12/2011 | Waldron, III | G06Q 10/0635 705/35 |
| 2012/0030081 | A1 * | 2/2012 | Ross | G06Q 40/00 705/35 |
| 2012/0095918 | A1 * | 4/2012 | Jurss | G06Q 20/40 705/44 |
| 2012/0166432 | A1 | 6/2012 | Tseng | |
| 2012/0209839 | A1 | 8/2012 | Andrews et al. | |
| 2012/0271831 | A1 | 10/2012 | Narayanan et al. | |
| 2013/0030994 | A1 * | 1/2013 | Calman | G06Q 30/02 705/40 |
| 2013/0053008 | A1 * | 2/2013 | Hymel | H04W 4/21 455/415 |
| 2013/0095460 | A1 * | 4/2013 | Bishop | G09B 5/06 434/308 |
| 2013/0159110 | A1 | 6/2013 | Rajaram et al. | |
| 2013/0218880 | A1 | 8/2013 | McConnell et al. | |
| 2013/0262312 | A1 * | 10/2013 | Carlson | G06Q 20/04 705/44 |
| 2013/0282808 | A1 * | 10/2013 | Sadanandan | G06Q 10/10 709/204 |
| 2014/0188639 | A1 * | 7/2014 | Dinardo, Sr. | G06Q 20/204 705/17 |
| 2014/0222506 | A1 * | 8/2014 | Frazer | G06Q 30/02 705/7.29 |
| 2015/0073902 | A1 * | 3/2015 | Soni | G06Q 30/0255 705/14.53 |
| 2015/0073959 | A1 * | 3/2015 | Connors | G06Q 40/00 705/35 |
| 2015/0088712 | A1 * | 3/2015 | Votaw | G06F 16/583 705/35 |
| 2015/0088717 | A1 * | 3/2015 | Votaw | G06Q 50/01 705/35 |
| 2015/0193768 | A1 * | 7/2015 | Douglas | G06Q 20/4016 705/44 |
| 2015/0206222 | A1 * | 7/2015 | Bart | G06Q 30/0631 705/26.7 |
| 2015/0220914 | A1 * | 8/2015 | Purves | G06Q 20/36 705/26.8 |
| 2015/0324880 | A1 * | 11/2015 | Huang | G06Q 20/204 705/26.35 |
| 2016/0148298 | A1 * | 5/2016 | Tang | G06K 9/00288 705/26.7 |
| 2016/0155126 | A1 * | 6/2016 | D'Uva | G06Q 20/4016 705/44 |
| 2016/0224997 | A1 * | 8/2016 | Blackhurst | G06Q 30/0202 |
| 2016/0253702 | A1 * | 9/2016 | Gonzales, Jr. | G06Q 30/0249 705/14.48 |
| 2017/0053186 | A1 * | 2/2017 | Allen | G06K 9/6215 |
| 2018/0182141 | A1 * | 6/2018 | Caballero | G06T 11/00 |
| 2018/0300486 | A1 * | 10/2018 | Adir | G06F 21/577 |
| 2019/0121808 | A1 * | 4/2019 | Chadha | G06F 16/951 |

OTHER PUBLICATIONS

Linn, Allison, Happy? Sad? Angry? This Microsoft tool recognizes emotions in pictures Nov. 11, 2015 (Year: 2015).*

Rachuri, Kiran K. et al., EmotionSense: A Mobile Phones based Adaptive Platform for Experimental Social Psychology Research UbiComp'10, ACM, Sep. 26-29, 2010 (Year: 2010).*

Suk, Myunghoon et al., Real-time Mobile Facial Expression Recognition System—A Case Study IEEE, CVPR2014, Computer Vision Foundation, 2014 (Year: 2014).*

Lathia, Neal et al., Smartphones for Large-Scale Behavior Change Interventions Pervasive Computing, IEEE CS, 2013 (Year: 2013).*

Bonchi et al., "Social Network Analysis and Mining for Business Applications", ACM Transactions on Intelligent Systems and Technology, vol. 2, No. 3, Article 22, Apr. 2011. 37 pages.

* cited by examiner

FINANCIAL ALERT SYSTEM BASED ON IMAGE OF USER SPENDING BEHAVIOR

CROSS-REFERENCE TO RELATED APPLICATIONS

This application claims the benefit of priority to U.S. Application No. 62/492,080, filed Apr. 28, 2017, entitled "IMAGE ANALYSIS AND RECOMMENDATION SYSTEM", which is hereby incorporated by reference in its entirety.

BACKGROUND

A wealth of information regarding an individual can be ascertained from photographs possessed by the individual. For example, some individuals tend to capture photographs of things that matter the most to them (e.g., family, friends, material possessions). Thus, individual preferences and other idiosyncrasies underlie the photographs associated with an individual. Such information may be leveraged to assist individuals in various ways.

SUMMARY

One embodiment relates to a user computing device. The user computing devices includes a network interface, an input/output ("I/O") device, an imaging device, and a processing circuit. The network interface is configured to communicate data over a network with a financial institution computing system associated with a financial institution. The I/O device is configured to exchange data with a user. The I/O device includes a display device configured to present a graphical user interface to the user. The imaging device is configured to generate image data. The processing circuit includes a memory and a processor. The memory is configured to store instructions that, when executed by the processor, cause the user computing device to receive, by at least one of the network interface, I/O device, and the imaging device, data indicative of a spending behavior of the user; generate a user spending alert based on the received data, the user spending alert including a photograph of the user; and present, via the display device, the user spending alert to the user.

Another embodiment relates to a computer-implemented method. The method includes receiving, by a mobile device associated with a user, data indicative of spending behavior of the user. The method also includes generating, by the mobile device, a user spending alert based on the received data, the user spending alert including a user photograph. The method also includes presenting, by a display device of the mobile device, the user spending alert to the user.

Another embodiment relates to a non-transitory computer readable media having computer-executable instructions embodied therein that, when executed by a processor of a user computing device associated with a user, causes the user computing device to perform operations to provide an alert to the user. The operations include receiving data indicative of a spending behavior of the user. The operations also include generating a user spending alert based on the received data, the user spending alert including a user photograph. The operations also include presenting the user spending alert to the user.

DETAILED DESCRIPTION

Figure 1:
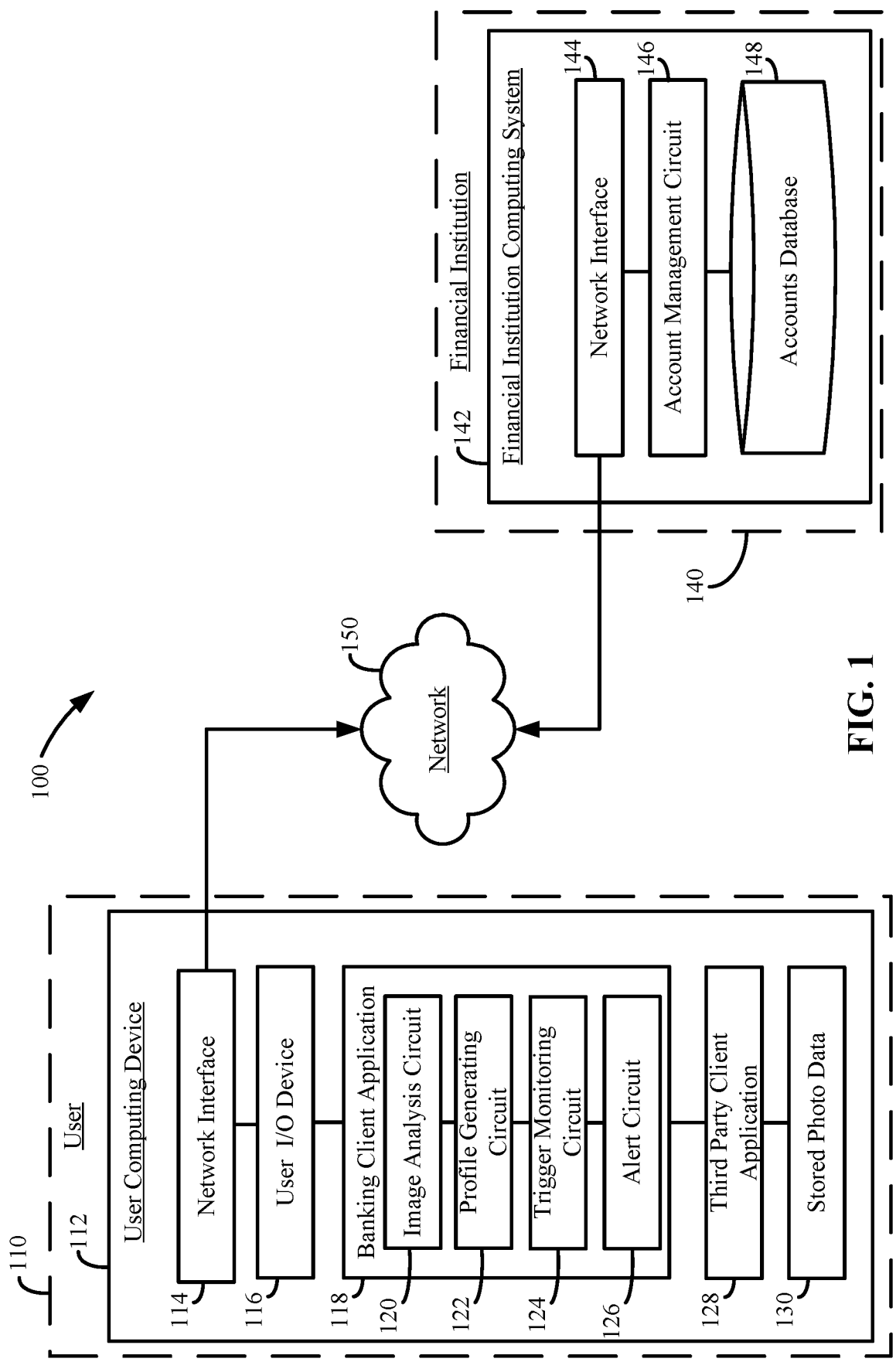
FIG. 1 is a block diagram illustrating an image analysis system, according to an example embodiment.

Before turning to the figures, which illustrate example embodiments, it should be understood that this application is not limited to the details or methodology set forth in the following description or illustrated in the figures. It should also be understood that the phraseology and terminology employed herein is for the purpose of description only and should not be regarded as limiting. For example, the embodiments of systems and methods discussed herein may be relevant to any of a variety of circumstances where providing an alert to a user may be useful.

Referring generally to the figures, systems and methods for providing photograph-based financial alerts to a user are shown according to example embodiments. A user computing device associated with the user receives data indicative of a user spending behavior. In various embodiments, the data indicative of a user spending behavior may include user transaction data received from a financial institution, an image captured by the user, and user location data. In some embodiments, upon receiving the data indicative of the user spending behavior, the user computing device analyzes the data to determine if the received data correlates with a user spending trigger. User spending triggers may include datasets (e.g., location datasets, user emotional states, user biometric datasets, and user transaction information) that have been determined to bear an association with negative user transactions (e.g., user overspending) or emotional states (e.g., happy, sad, excited). In some embodiments, upon determining that the received data correlates with a user spending trigger, the user computing device generates and presents a spending alert including a photograph of the user. In some embodiments, the photograph bears a relationship to a user financial goal or obligation. As a result, the user is effectively reminded to avoid harmful spending.

The embodiments and implementations of the systems and methods disclosed herein improve current spending alert systems by providing users with dynamic, individually-tailored spending alerts. This is done through leveraging user photograph data in at least two different ways. First, user photograph data is used to identify user preferences correlated with user transaction data to generate a financial profile for the user. The financial profile may identify a user budget as well as include a set of user spending triggers. Secondly, user photograph data is used to generate user spending alerts that are presented to the user when it is determined, through the systems and methods disclosed herein, that the user may engage in a negative transaction (e.g., transactions departing from the budget of the user's financial profile). Thus, the systems and methods disclosed herein utilize user photograph data both in formulating triggers for user alerts and in the alerts themselves. As will become more apparent based on the following description, this multi-faceted leveraging of user photograph data facilitates the provisioning of well-timed, personalized spending alerts and product offers.

The embodiments discussed herein may be relevant to any of a variety of circumstances where providing an alert to a user may be useful. For example, in one embodiment, user photograph data may be leveraged in accordance with the systems and methods disclosed herein in offering a product to the user. To illustrate, an advertisement including a user photograph identified as positive via the methods described below may be presented to the user. The inclusion of such an image personalizes the advertisement, thus making the user more likely to view the advertisement. As such, the systems and methods disclosed herein may be utilized to improve many current systems.

Referring now to FIG. 1, a block diagram of an image analysis system 100 is shown according to an example embodiment. As described in further detail herein, the image analysis system 100 facilitates the delivery of personalized alerts and advertisements to a user 110. In this regard, the image analysis system 100 retrieves or otherwise accesses photograph data associated with the user 110 to determine user preferences and identify the timings of positive user emotional states and negative user emotional states. Based on such preferences and timings, the image analysis system 100 identifies products to recommend to the user 110 and/or various circumstances that may be associated with negative emotional states of the user 110. Upon detection that the user 110 is potentially in one of the identified circumstances, an alert is provided to the user 110.

The user 110 includes any type of entity capable of being monitored and engaging in a transaction. In some arrangements, the user 110 is an individual holding an account at a financial institution 140. In some arrangements, the financial institution 140 offers an alert program to the user 110. The financial institution 140 may include commercial or private banks, credit unions, investment brokerages, or the like.

The image analysis system 100 includes a user computing device 112 associated with the user 110 and a financial institution computing system 142 associated with the financial institution 140, whereby these components are communicably coupled to each other over a network 150. The network 150 provides communicable and operative coupling between the user computing device 112, the financial institution computing system 142, and other components described herein to provide and facilitate the exchange of communications (e.g., data, instructions, messages, values, commands). The network 150 is a data exchange medium, which may include wireless networks (e.g., cellular networks, Bluetooth®, WiFi, Zigbee®), wired networks (e.g., Ethernet, DSL, cable, fiber-based), or a combination thereof. In some arrangements, the network 150 includes the Internet. In some embodiments, the network 150 may further include a proprietary banking network to provide secure or substantially secure communications.

The user computing device 112 is a computing device associated with the user 110. The user computing device 112 includes any type of computing device that may be used to receive information from the financial institution computing system 142. In some arrangements, the user 110 uses the user computing device 112 to communicate with various third party computing systems (not shown). Third party computing systems may, for example, provide a social media platform enabling the user to communicate with various other users, a search engine enabling the user to locate and access information, and the like. In this regard, the user computing device 112 may include any wearable or non-wearable device. Wearable devices refer to any type of device that an individual wears including, but not limited to, a watch (e.g., smart watch), glasses (e.g., eye glasses, sunglasses, smart glasses), bracelet (e.g., a smart bracelet), etc. User computing device 112 may also include any type of mobile device including, but not limited to, a phone (e.g., a smart phone), tablet, personal digital assistant, and/or computing devices (e.g., desktop computer, laptop computer, personal digital assistant).

In the example embodiment shown, the user computing device 112 includes a network interface 114 enabling the user computing device 112 to exchange information over the network 150, a user input/output ("I/O") device 116, a banking client application 118, a third party client application 128, and stored photograph data 130. The user I/O device 116 includes hardware and associated logics configured to enable the user computing device 112 to exchange information with the user 110. An input device or component of the user I/O device 116 allows the user 110 to provide information to the user computing device 112, and may include, for example, a mechanical keyboard, a touchscreen, a microphone, a camera, a fingerprint scanner, any user input device engageable with the user computing device 112 via a USB, serial cable, Ethernet cable, and so on. An output device or component of the user I/O device 116 allows the user 110 to receive information from the user computing device 112, and may include, for example, a digital display, a speaker, illuminating icons, LEDs, and so on.

The banking client application 118 is structured to provide displays to the user computing device 112 that enable the user 110 to manage financial accounts. Accordingly, the banking client application 118 is communicably coupled to the financial institution computing system 142 (e.g., the account management circuit 146) and is structured to permit management of user financial accounts and transactions. The displays provided by the banking client application 118 may be indicative of current account balances, pending transactions, profile information (e.g., contact information), and the like. Additionally, the banking client application 118 is also configured to present an alert to the user using the systems and methods disclosed herein.

In some embodiments, the banking client application 118 is a separate software application implemented on the user computing device 112. The banking client application 118 may be downloaded by the user computing device 112 prior to its usage, hard coded into the memory of the user computing device 112, or be a web-based interface application such that the user computing device 112 may provide a web browser to the application, which may be executed remotely from the user computing device 112. In the latter instance, the user 110 may have to log onto or access the web-based interface before usage of the applications. Further, and in this regard, the banking client application 118 may be supported by a separate computing system including one or more servers, processors, network interface circuits, etc. that transmit applications for use to the user computing device 112 (e.g., the financial institution computing system 142). In certain embodiments, the banking client application 118 includes an API and/or a software development kit (SDK) that facilitates the integration of other applications (e.g., the third party client application 128) with the banking client application 118.

In some embodiments, the banking client application 118 includes program logics that cause the user computing device 112 to perform the systems and methods disclosed herein. In this regard, the banking client application 118 is shown to include an image analysis circuit 120, profile generating circuit 122, a trigger monitoring circuit 124, and alert circuit 126. It should be understood that, in some embodiments, the banking client application 118 includes more, less, or different circuits. For example, the activities of one circuit may be combined with those of another circuit. In some embodiments, the methods and functionalities described below may be performed at the financial institution computing system 142 rather than at the user computing device 112. Thus, the embodiment shown is for example purposes only.

The image analysis circuit 120 is configured to retrieve user photograph data and assess user photos to learn various user characteristics and preferences. In this regard, the image analysis circuit 120 may be configured to retrieve stored photograph data 130 on the user computing device 112. Stored photograph data 130 may include any form of information regarding user photos stored on the user computing device 112. For example, stored photograph data 130 may have been captured by a camera included in the user I/O device 116 and stored in association with photograph metadata (e.g., a photograph timing, location, file name, location, caption) in the memory of the user computing device 112. Additionally, the image analysis circuit 120 may also be configured to retrieve user photograph data stored in association with other applications on user computing device 112, such as the third party client application 128.

The third party client application 128 is an application provided by a third party entity (e.g., an entity other than the financial institution 140). For example, the third party client application 128 may be a social media application, a photograph management and storage application, or any other type of application. In some embodiments, the user computing device 112 includes a number of different third party client applications 128. A user 110 may store photos in relation to a third party client application 128. For example, in the case of a social media application, user photograph information may be stored at a remote computing system. Such user photograph information may include the actual image data associated with the user photos, photograph captions, comments on the photos, and photograph timing information. To access these photos, the user 110 may have to log into a web-based or application portal. In some embodiments, the image analysis circuit 120 of the banking client application 118 includes various application programming interfaces (APIs) that facilitate the banking client application 118 accessing such user photograph information stored at the external computing system (or at the user computing device 112) in association with third party client applications 128.

Upon retrieving the user photograph information, the image analysis circuit 120 is configured to assess the user photograph data to determine various user preferences and characteristics. Certain user characteristics may be gathered directly from image data contained in the retrieved photograph information. For example, the image analysis circuit 120 may perform a process to identify individuals (or pets) other than the user 110 that are in the photos of the user 110. In this regard, the image analysis circuit 120 may identify a first photograph that includes both the user 110 and at least one other individual. Next, the image analysis circuit 120 may search additional user photographs for the other individual. If a particular individual appears in multiple user photos, the image analysis circuit 120 may assess the photograph metadata to ascertain the identity of the other individuals (e.g., the other individual may be named in a caption or "tagged" in the photo). Alternatively, additional user characteristics may be learned through assessment of the photograph metadata. For example, the captions or other image metadata may reveal that the other individual in the photos is a child of the user 110.

The image analysis circuit 120 may also identify other patterns in the user photos. For example, the image analysis circuit 120 may perform a color shading analysis on each user photograph to estimate the identity of various objects contained in the user photos. For example, if a shading analysis of the user photos reveals multiple instances of the user 110 holding a particular object (e.g., a musical instrument, sporting equipment, gaming counsel, etc.), the image analysis circuit 120 may identify the object based on the grouping of pixel shading contained in the image data (e.g., the image analysis circuit 120 may include a plurality of object signatures to which the user photograph data may be compared).

Additionally, the image analysis circuit 120 is also configured to determine the emotional state of the user 110 in the various user photos. For example, the image analysis circuit 120 may identify photos containing the face of user 110 and perform an assessment of the relative positioning and size of various user facial features (e.g., lips, eyes, eyebrows, and chin) to estimate the emotional state of the user. In one embodiment, in a registration process for the alert program offered by the financial institution 140 the user 110 may provide a baseline user image. The baseline user image may be an image of the face of user 110s as the user 110 smiles. The relative positioning of the mouth of user 110 in one of the retrieved user photos may be compared to that in the baseline image to approximate the emotional state of user 110. Photos in which the relative positioning or size of the mouth of user 110 differs from that in the baseline image may be classified as user negative emotion photos and photos in which the relative positioning or size of the mouth of user 110 mouth is similar to that in the baseline user image may be classified as positive user photos. Upon classifying each user photograph contained in the retrieved user photograph data as either a positive or a negative user photo, the image analysis circuit 120 may identify the timing of each such identified photograph. As such, the timing of user positive emotional states and user negative emotional states may be determined.

Alternatively or additionally, the image analysis circuit 120 may assess the image metadata to ascertain the emotional state of user 110. For example, the image analysis circuit 120 may identify a user reaction to the photograph (e.g., a "like") or perform a textual analysis of a user comment on the photograph to approximate the emotional state of user 110 relating to each one of the photos.

Additional user preferences or characteristics may be gained through assessment of the photograph metadata. For example, the image analysis circuit 120 may perform an assessment of the location data associated with each user photograph to determine user location preferences. The most common location associated with the user photos may be identified as a user "home" or baseline location. If the location information stored in association with a number of other user photos differs from the user baseline location by more than a predetermined amount, this is an indication that the user 110 frequently travels. In such a case, the image analysis circuit 120 may identify traveling as a user preference.

Additionally, the image analysis circuit 120 may identify a set of user-preferred locations where the user photos are most commonly taken. User-preferred locations may be associated with a particular location (e.g., set of GPS coordinates) or location criteria (e.g., a distance away from a reference point, such as the baseline location of user 110 or from another reference point like a particular merchant).

In some embodiments, the image analysis circuit 120 performs an additional assessment of the photograph metadata. For example, user emotional associations may be gathered from the photograph metadata. In this regard, the image analysis circuit 120 may scan the photograph metadata for various indications of the emotional state of user 110. User emotional indicators may include various proxies for a contemporaneous user emotional state such as certain words or phrases (e.g., the phrase "I'm disappointed" and other similar phrases may be negative user emotional indicators). Other emotional indicators may be associated with other aspects of the photograph data. For example, certain times (e.g., past 2:00 AM) may be a negative user emotional indicator. Additionally, the photograph metadata may be further assessed for additional user preferences. Comments, captions, or photograph names associated with the photos may be worded such that they reveal user preferences. Items included in positive statements may be identified as user preferences, for example.

The profile generating circuit 122 is configured to utilize the information gained from the user photograph data to build a user profile. The user profile may contain the various user preferences or characteristics of the user learned by the image analysis circuit 120. In various embodiments, such preferences may be utilized to customize the displays presented to the user by the banking client application 118. For example, the displays presented to the user 110 by the banking client application 118 may include a portion used by the financial institution 140 to inform the user 110 regarding various products offered by the financial institution 140. The specific products presented in such a portion may be individually tailored to the user 110 based on the user preferences. For example, if the analysis performed by the image analysis circuit 120 reveals that the user 110 likes to travel, a travel rewards credit card may be advertised to the user 110. In another example, if the user photograph data reveals that the user 110 has a child, a college savings program advertisement may be presented to the user.

In some embodiments, the user profile is configured to effect the manner of operation of the banking client application 118. For example, via the methods described herein, the banking client application 118 may generate and present various alerts to the user 110 to prevent the user 110 from engaging in certain spending behavior. The user profile generated by the profile generating circuit 122 may be used to determine the timing of such alerts. In this regard, the profile generating circuit 122 may generate a set of user alert triggers. User alert triggers may include datasets (e.g., location datasets, user emotional states, user biometric datasets, and user transaction information) that have been determined to bear an association with negative user transactions (e.g., user overspending) or emotional states. To generate such triggers, the profile generating circuit 122 may integrate the information regarding the user 110 gathered from the user photograph data with user financial data stored at the financial institution computing system 142.

In this regard, the profile generating circuit 122 may be configured to request information from the financial institution computing system 142 over the network 160. For example, the profile generating circuit 122 may formulate an information request containing a unique user identifier for transmittal to the financial institution computing system 142 over the network 160 via the network interface 114. The unique user identifier may have been assigned to the user 110 when the user 110 installed the banking client application 118 on the user computing device 112. In response to receipt of such a request, the financial institution computing system 142 (e.g., via the account management circuit 146 described below) may retrieve user financial data (e.g., a user transaction history and user account balance information) from the accounts database 148 and transmit the user financial data to the user computing device 112 over the network 160.

Upon receipt of the user financial data by the user computing device 112, the profile generating circuit 122 may generate a set of user financial guidelines based on the user transaction data. For example, based on the information gathered from the user photograph data (e.g., family information and user interests or preferences) and the user financial information, the profile generating circuit 122 may generate a budget for the user 110. The budget may allocate the funds or income of user 110 (e.g., determined based on a direct deposit into an account held by the user 110 at the financial institution 140) towards living expenses (e.g., adjusted based on the user family information gained through analysis of the user photograph data) and other user interests (e.g., travel, hobbies, etc.). In some embodiments, the allocations provide suggested amounts that the user 110 should spend on a particular category or interest. In some embodiments, the user financial guidelines are generated at the financial institution computing system 142 (e.g., via the account management circuit 146) and transmitted to the user computing device 112.

In addition to allocating user funds, the financial guidelines may generate a set of transaction parameters that define transactions that should be avoided by the user 110 given the budget of user 110. Such parameters may include location datasets (e.g., associated with merchants selling products at prices outside of the budget of user 110) and incremental spending amounts (e.g., an amount spent by the user 110 within a predefined period of time). In some embodiments, the financial guidelines also include various other user financial goals. For example, the profile generating circuit 122 may suggest an amount that the user 110 should set aside for the college tuition of a child of user 110.

Having generated the user financial guidelines, the profile generating circuit 122 may generate a set of user alert triggers based on the user transaction data and user photograph data. Regarding the user transaction data, the profile generating circuit 122 may identify time periods when the user 110 did not follow the financial guidelines discussed above. For example, if the user 110 spent more than an allocated amount over the course of a given week, the profile generating circuit 122 may identify a transaction or set of transactions that caused the user 110 to deviate from the guidelines. To perform this identification, the profile generating circuit 122 may determine baseline user spending patterns (e.g., a set of most common merchants shopped at by the user 110, or a statistical distribution of the timing of various user transactions), and identify transactions that deviate from the user's baseline spending patterns. For example, if a user 110 engages in an irregular transaction (e.g., a large purchase such as furniture or an appliance), the profile generating circuit 122 may identify various aspects of the transaction (e.g., the timing, the merchant name, the merchant location, etc.) and set those aspects as user alert triggers.

In some embodiments, the profile generation circuit 122 generates user overspending triggers based on general information regarding the user (e.g., a user income level, biographical user data, and user interests determined via the analysis of the user photograph data discussed above). For example, the profile generation circuit 122 may select a subset of general triggers for the user 110 based on the income and location of user 110. The general triggers may include parameters descriptive of general spending activity that is avoided by financially healthy individuals having comparable information (e.g., income level, location, family status, etc.) to the user 110. Such general triggers may include location datasets (e.g., locations associated with merchants avoided by the financially healthy individuals), spending patterns (e.g., temporal spacing between transactions above a specified amount), and other financial habits (e.g., investing patterns, the patterns in which funds are placed into a savings account, etc.).

Regarding the user photograph data, the profile generating circuit 122 may be configured to correlate the timing of user emotional states (as determined by the image analysis circuit 120) with the timing of transactions of the user 110. Characteristics of user transactions that are consistently timed relative to negative user emotional states may be set as user alert triggers. For example, if the user photograph data indicates that the user 110 is consistently in a negative emotional state at a certain time after (e.g., the next day) after the user 110 engages in particular type of transaction (e.g., at a restaurant or entertainment venue), the profile generating circuit 122 may set characteristics of those transactions as user alert triggers.

Alternatively or additionally, having determined that a particular user photograph is associated with negative user spending behavior, the profile generating circuit 122 may set data associated with that photograph as a user alert trigger. For example, the location where the photograph was taken may be set as a user alert trigger. In another example, a portion of the photograph that includes the image of another individual that is with the user 110 may be set as a user alert trigger. This way, via the methods described below, if the user 110 takes a photograph with that other individual with whom they tend to overspend, an alert is provided to the user 110 to prevent the user 110 from engaging in such overspending.

In some embodiments, additional types of user data may be set as user alert triggers. For example, activity or biometric data regarding the user 110 captured by the user computing device 112 or an external device (e.g., a user activity tracker measuring user steps and heartrate) may be received by the profile generating circuit 122, correlated with user transactions and/or emotional states, and established as a user alert trigger. For example, if analysis of patterns in user activity data reveals that a user tends to overspend during time periods where the user's heartrate is within a certain range, or when the user takes above a certain number of steps in a predetermined period, such datasets may be established as user alert triggers.

In some embodiments, the profile generating circuit 122 is configured to match the generated user alert triggers to various user financial goals. As described below, this matching facilitates effective alerts being presented to the user 110 in response to particular triggers being detected. In some embodiments, the matching is based at least in part on the transaction data used to generate the user alert triggers. For example, the matching may be based on the amount of the transactions of user 110. User alert triggers associated with transactions or sets of transactions that differ from user financial guidelines by a limited amount, for example, may be paired with short term user financial guidelines (e.g., weekly spending budgets); while user alert triggers associated with transactions that differ from user spending events by a larger amount may be paired with more long-term user financial goals (e.g., investment goals and savings account goals).

The trigger monitoring circuit 124 is configured to monitor the user 110 for occurrence of the user alert triggers established by the profile generating circuit 122. In this regard, the trigger monitoring circuit 124 is configured to assess data from various sources to determine if the data is indicative of any of the user alert triggers. The data analyzed by the trigger monitoring circuit 124 may include user transaction data received from the financial institution computing system 142, user photograph data, user location data, data gathered from the third party client application 128 (e.g., user social media posts and photos, events on a user calendar, a user search history), and other user data (e.g., user activity data). Regarding user photograph data, the trigger monitoring circuit 124 may include an API that links with a camera on the user computing device 112 such that, each time the user captures a photograph with the camera, the photograph data is made accessible to the trigger monitoring circuit 124. Upon accessing the photograph data, the trigger monitoring circuit 124 may perform an assessment of the image data in the photograph for user alert triggers. For example the trigger monitoring circuit 124 may determine the emotional state of the user 110, or ascertain if the photograph contains any other individuals that were previously identified by the profile generating circuit 122 as user alert triggers.

In some embodiments, the trigger monitoring circuit 124 also periodically receives user location data generated by a GPS device on the user computing device 112. To determine if the location data is indicative of a user alert trigger, the trigger monitoring circuit 124 determines if the most recent location measurement is within a threshold of location data previously established as a user alert trigger. Additionally, the trigger monitoring circuit 124 analyzes user transaction data periodically received from the financial institution computing system 142 for user alert triggers. For example, the profile generating circuit 122 may identify certain user transactions (e.g., at a particular type of merchant) as triggers for later user spending. Accordingly, the trigger monitoring circuit 124 may assess the most recent transactions of user 110 for the occurrence of any user alert triggers.

Regarding third party application data, the trigger monitoring circuit 124 is configured to periodically retrieve user data stored in association with the third party client application 128 (e.g., either on the user computing device 112 or from an external third party computing system) and analyze the retrieved data to determine if any indications of user alert triggers are present. In an example, the third party client application 128 is a calendar application enabling the user 110 to input information regarding upcoming appointments or other events. Upon retrieving data regarding upcoming events of the user 110 stored in association with the third party client application 128, the trigger monitoring circuit 124 is configured to perform a textual analysis of the description of the user events (e.g., attendee information, location information, timing information, and the like) to determine if any user alert triggers are present. For example, if an event is at a merchant at which the user 110 previously overspent, a user alert trigger is present. Similar analysis may be performed with respect to data gathered from other third party applications (e.g., social media applications and user web browsing histories).

It should be noted that, while in the example shown the trigger monitoring circuit is on the user computing device 112, other embodiments are envisioned. For example, once the profile generating circuit 122 on the user computing device 112 generates a set of user alert triggers, the triggers may be transmitted to the financial institution computing system 142 and stored in association with the user 110 at the accounts database 148. In such an embodiment, the alert circuit 126 may be placed at the financial institution computing system 142 which may monitor user transaction data for the occurrence of certain user alert triggers (e.g., transactions at merchants that are correlated with negative user emotional states). Upon detection of such a trigger, the financial institution computing system 142 may transmit a notification to the user computing device 112 identifying the detected trigger. In response, the banking client application 118 may present an alert to the user 110 via the methods described below.

The alert circuit 126 is configured to retrieve or generate user alerts for presentation to the user 110 in response to the trigger monitoring circuit 124 receiving an indication of the occurrence of a user alert trigger. The user alerts may contain a user photo. In some embodiments, the previously captured user photograph includes a user photograph where the user 110 is in a negative emotional state. The particular photograph may be selected based on the detected alert trigger. For example, in an embodiment, the user alert trigger may be associated with a particular user photograph (e.g., the profile generating circuit 122 paired user photograph to the alert trigger based on data associated with the photograph or a transaction having a timing that was correlated with the photo), that photograph may be retrieved and presented to the user 110. This way, the user is pre-emptively reminded of the negative emotional state caused by the spending activity, and potentially prevented from re-performing such actions.

In some embodiments, the user alerts contain photos where the user 110 is in a positive emotional state (e.g., as identified by the image analysis circuit 120). The particular photograph contained by the alert may be randomly selected by the alert circuit 126. For example, the alert circuit 126 may select a subset of stored photograph data 130 that was previously identified by the image analysis circuit 120 as positive user photograph data. The identified data may be re-formatted for presentation to the user 110 and stored in association with the banking client application 118 on the memory of the user computing device 112. This way, upon detection a user alert trigger, the subset of photograph data may be retrieved and included in an alert presented to the user 110. In some embodiments, such positive user photos are presented to the user 110 in response to the trigger monitoring circuit 124 receiving an indication that the user is in a negative emotional state (e.g., based on a recently captured photo, a recent transaction, or a recent user social media post).

In some embodiments, the user photos contained in the user spending alerts are selected to bear a relationship to a user financial goal or other financial guidelines included in the profile of user 110. In this regard, upon the profile generating circuit 122 generating a user profile, the alert circuit 126 may be configured to match previously captured user photograph data to particular user alert triggers. Such matching may be based on the particular financial goal that the user alert triggers were previously paired with by the profile generating circuit 122. For example, if a particular user alert trigger was paired with an investment goal for a college tuition investing plan, the alert circuit 126 may assess the user photograph data to identify any user photos that contain an image of a child of user 110, and store the identified photos in association with the alert trigger. This way, upon detection of the alert trigger by the trigger monitoring circuit 124, the user 110 is reminded of an important long-term financial goal that may be impacted by potential spending behavior.

In some embodiments, the user spending alerts contain information regarding the financial status of the user 110. For example, an alert may include an account balance of the user 110 or an amount that the user 110 has spent over a period (e.g., a month). In some embodiments, the particular information included on the user spending alert is selected based on the user alert trigger detected to have occurred. For example, upon the detection of a user alert trigger previously associated with a particular long term user financial goal, the alert circuit 126 may request information regarding an investment account of the user 110 at the financial institution 140. In response, the financial institution computing system 142 may retrieve information regarding the user investment account, and transmit that information back to the user computing device 112 for incorporation into the user alert. For alert triggers associated with short term user financial goals, specific subsets of user transaction data received from the financial institution computing system 142 may be selected for presentation to the user. For example, the alert circuit 126 may identify a recurring expense (e.g., a rent payment or a utility bill) of the user 110 from a set of user transaction data received from the financial institution computing system 142, and include the recurring expense in a spending alert. This way, the user 110 is reminded of expenses that they must make prior to engaging in other types of overspending.

In some embodiments, the alert circuit 126 presents previously-captured photos of the user 110 in response to the detection of certain user transactions. For example, upon the detection of an out-of-the ordinary negative user transaction (e.g., car repairs, home repairs, medical expenses, funeral expenses, etc.), the alert circuit 126 may select a positive user photograph for presentation to the user 110. As such, the banking client application 118 reminds the user 110 of positive times.

Still referring to FIG. 1, the financial institution computing system 142 is a computing system associated with the financial institution 140. In the example embodiment shown, the financial institution computing system 142 includes a financial institution network interface 144 enabling the financial institution computing system 142 to exchange data over the network 150, an account management circuit 146 and an accounts database 148. The accounts database 148 is structured to retrievably store information pertaining accounts held by a number of customers at the financial institution. The accounts database 148 may include non-transient data storage mediums (e.g., local disc or flash-based hard drives, local network servers) or remote data storage facilities (e.g., cloud servers). The accounts database 148 may include personal customer information (e.g., names, addresses, phone numbers), identification information (e.g., driver's license numbers, standard biometric data), and customer financial information (e.g., token information, account numbers, account balances, available credit, credit history, transaction histories).

The account management circuit 146 is configured to manage the financial accounts of various customers, including maintaining and handling transaction processing for various customer accounts. In some embodiments, the banking client application 118 is provided by the account management circuit 146. In this regard, the account management circuit 210 is configured to transmit various instructions, data, and values utilized by the banking client application 118 on the user computing device 112 to present the various displays to the user 110 described herein. In some embodiments, the account management circuit 146 performs various operations described herein as being performed by the user computing device 112 via the banking client application 118.

Figure 2:
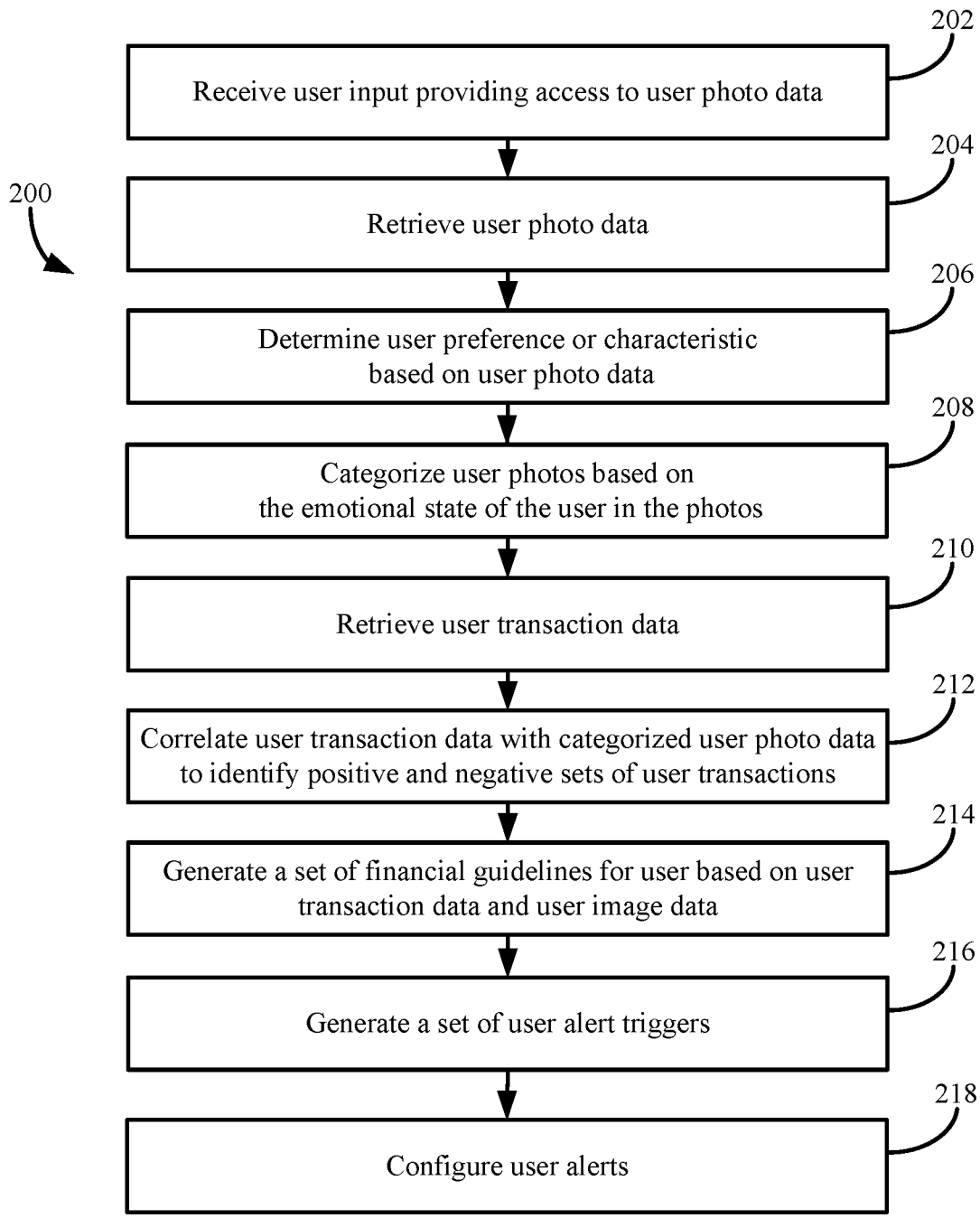
FIG. 2 is a flowchart of a method of generating a financial profile for a user based on user image data, according to an example embodiment.

Referring now to FIG. 2, a flow chart of a method 200 of generating a financial profile for a user 110 based on user photograph data is shown, according to an example embodiment. The method 200 may be performed by components of FIG. 1 such that references may be made to one or more components of FIG. 1 to aid the description of the method 200.

At step 202, a user input providing access to user photograph data is received. The user 110 may provide such an input to the image analysis circuit 120 of the banking client application 118 on the user computing device 112. In one embodiment, the banking client application 118 presents the user 110 with an interface that enables the user 110 to indicate a preference to register for a photograph alert program provided by the financial institution 140. In response to the user 110 indicating such a preference, the banking client application 118 may cause the user computing device 112 to transmit a notification signal to the financial institution computing system 142 over the network 150. In turn, the financial institution computing system 142 may transmit an updated banking client application 118 (e.g., including the image analysis circuit 120, profile generating circuit 122, trigger monitoring circuit 124, and alert circuit 126) to user computing device 112. In some embodiments, the banking client application 118 shown in FIG. 1 is already installed on the user computing device 112, and the user 110 provides an input to provide the banking client application 118 permission to access user photograph data.

In some embodiments, the input specifies multiple locations from which user photograph data may be retrieved. For example, the user 110 may indicate that there is user photograph data stored at a remote server (e.g., cloud photograph storage or a social media platform), and provide the banking client application 118 permission to access the user photograph data stored at the remote server. In some embodiments, the input enables the banking client application 118 to access user photograph data stored in association with third party client applications 128 on the user computing device 112.

At step 204, user photograph data is retrieved. In some embodiments, the image analysis circuit 120 of the banking client application 118 retrieves user photograph data from various locations. For example, in some arrangements, the user computing device 112 includes stored photograph data 130 that is in the memory of the user computing device 112. In such arrangements, upon receiving permission at step 202, the image analysis circuit 120 retrieves the stored photograph data 130, which may include sets of image data and photograph metadata (e.g., titles, captions, time stamps, location coordinates).

In some embodiments, the image analysis circuit 120 accesses user photograph data stored externally from the user computing device 112. For example, the image analysis circuit 120 may include various APIs through which remotely stored user photograph data may be requested and received from external computing systems (e.g., external computing systems providing or otherwise associated with third party client applications 128) over the network 150. After user photograph data is retrieved, a set of user photograph data includes a set of user photos and associated photograph metadata.

At step 206, user preferences and characteristics are determined based on the retrieved user photograph data. In some embodiments, the image analysis circuit 120 performs an assessment of the images associated with the retrieved user photograph data as well as photograph metadata to generate a user profile. For example, the image analysis circuit 120 may identify other individuals that are commonly in the photos of user 110. Photograph metadata (e.g., titles and captions associated with the images) may then be assessed to ascertain the identity and status (e.g., family member or friend) of the other individuals. Additionally, the images may be analyzed to reveal other user preferences. For example, objects present in the images may be identified to reveal various user preferences (e.g., hobbies and interests).

Photograph metadata may also reveal various user preferences. For example, location and timing data associated with each image may reveal user-preferred locations. Patterns in the location data may also reveal other user preferences (e.g., where the user 110 works and lives, whether the user 110 likes to travel). In another example, photograph titles or captions may reveal various other characteristics about the user (e.g., the user 110 has a pet or child).

At step 208, the user photos are categorized based on the emotional state of the user 110 in the photos. In some embodiments, the image analysis circuit 120 determines the emotional state of the user 110 in photos containing the user 110 by assessing portions of the image data that contains the user 110' face. For example, the image analysis circuit 120 may compare the user photos to a photograph of the user 110 in which the user 110 is in a baseline emotional state (e.g., happy). The relative positioning of various user facial features in the user photos may be compared to the baseline image to estimate the emotional state of user 110.

In some embodiments, the image analysis circuit 120 assesses photograph metadata to estimate the emotional state of the user 110 at the time that each user photograph was taken. For example, the image analysis circuit 120 may assess photograph captions or titles to determine whether any indicators of user positive emotional states (e.g., positive words, exclamations) or indicators of user negative emotional states (e.g., negative words) are present. In another example, user actions taken with respect to the photos may be used as an indication of the emotional state of user 110. For example, some photograph data that the user 110 posted on social media may contain information regarding user reactions to the photograph (e.g., a user 110 may "like" a photograph or "tag" themselves in a photograph). As such, the image analysis circuit 120 may assess such information to ascertain the emotional state of the user 110. A user "liking" a photograph may indicate a positive user emotional state, while a user "un-tagging" themselves from a photograph may indicative a negative user emotional state.

In some embodiments, the image analysis circuit 120 verifies an estimate of the emotional state of user 110 using various aspects of the photograph data. For example, the image analysis circuit 120 may generate a first estimate based on the image data (e.g., the relative positioning of user facial features) and a second estimate based on photograph metadata. If the first estimate matches the second estimate, the emotional state of user 110 at the time of the photograph is verified.

As a result of the categorization of the user photograph data, the banking client application 118 is aware of various patterns in user emotional states. In other words, the banking client application 118 has determined times when the user 110 is in a positive emotional state and times when the user 110 is in a negative emotional state.

At step 210, user transaction data is retrieved. In various embodiments, the profile generating circuit 122 requests the user transaction data from the financial institution computing system 142 over the network 150. The financial institution computing system 142 (e.g., via the account management circuit 146) may retrieve user transaction data (e.g., including user account balance information, information describing the timing, merchants, and amounts, of various user transactions) from the accounts database 148, and transmit the user transaction information over the network 150 to the user computing device 112.

At step 212, the user transaction data is correlated with the categorized user photograph data to identify a positive set of user transactions and a negative set of user transactions. In various embodiments, each transaction in the positive set of user transactions is timed such that it bears a relationship to a set of user photograph data that was determined to be indicative of a positive user emotional state (e.g., within a predetermined timing threshold of the photograph data). Accordingly, the profile generating circuit 122 may compare the timing of various user photos to the timing of various user transactions to identify the positive and negative sets of user transactions. In an example, a first transaction occurring prior to a first user photograph in which the user 110 is in a positive emotional state may be identified as a positive user photo. A second transaction occurring prior to a second user photograph in which the user 110 is in a negative emotional state may be identified as a negative user photo.

At step 214, a set of financial guidelines is generated for the user 110 based on the user transaction data and the user photograph data. The profile generating circuit 122 may generate such guidelines based in part on the user transaction data received from the financial institution computing system 142. For example, various characteristics of the financial situation of user 110 may be ascertained based on the transaction data received from the financial institution computing system 142. For example, the income of user 110 may be estimated based on account balance information (e.g., a direct deposit). User family information (e.g., spouse and children information) may also be received from the financial institution computing system 142 (e.g., such information may also be stored in the accounts database 148). Based on the user 110's financial situation and the user preferences (e.g., interests and hobbies) identified from the user photograph data, the profile generating circuit 122 may generate a user budget that allocates the income of user 110 to various user interests (e.g., family and living expenses, hobbies, travel, investments, etc.). The user budget may include a suggested amount that the user 110 should spend each month on a particular category.

In some embodiments, the user financial guidelines include other user financial goals (e.g., financial goals other than spending less than the allocations provided by the budget discussed above). For example, the user financial guidelines may include amounts that the user should set aside in savings or invest. In some embodiments, the financial guidelines may suggest an investment product to the user 110 (e.g., a retirement account, a college tuition savings account) and provide suggested amounts that the user 110 should set aside in such products over a predetermined period. In some embodiments, the investment products suggested to the user 110 may be identified based on the information gained from the user 110 via analysis of the user photograph data. For example, if analysis of the user photograph data reveals that the user 110 has a young child, a college tuition investment account may be included in the financial guidelines.

At 216, a set of user alert triggers is generated. In some arrangements, the profile generating circuit 122 generates some user alert triggers based on the transaction data received from the financial institution computing system 142 at 210. For example, the profile generating circuit 122 may identify a set of user transactions that caused the user 110 to depart from the user budget discussed above. In this regard, the profile generating circuit 122 may identify a time period when the user 110 spent more than an allocated amount on a particular category (e.g., a particular week where the user 110 spent more than an allocated amount on living expenses). Next, the profile generating circuit 122 may identify a transaction or set of transaction that cased the deviation (e.g., a transaction having an amount that is greater than what is normally spent by a user 110 at a particular merchant or a transaction at a merchant not commonly shopped at by the user 110). Various characteristics of the identified transaction (e.g., location coordinates associated with the merchant, the amount, the timing), may then be set as user alert triggers.

In some embodiments, if a user photograph was identified to have been captured near the time of the identified transaction (e.g., a photograph in the positive or negative sets of user photos), various characteristics of the user photograph (e.g., the identity of other individuals in the user photo, the location of the user photo) may also be set as user alert triggers. This way, a more comprehensive set of user alert triggers is generated. As a result, the banking client application 118 more effectively alerts the user 110 when the potential to engage in a negative transaction arises.

In some embodiments, other user alert triggers are generated based on the user photos categorized as being indicative of a negative user emotional state of the user 110 at 208. For example, location coordinates associated with the negative photos, the identity of other individuals in the negative photos, and the timing of the user negative photos may be set as user alert triggers. This way, the banking client application 118 may provide a positive alert to the user 110 when it is detected that the user 110 may be in a negative emotional state.

At 218, user alerts are configured. In some embodiments, the profile generating circuit 122 performs a multi-step process to configure the user alerts. First, the profile generating circuit 122 may pair certain user alert triggers to certain user financial guidelines generated at step 214. In some embodiments, such pairing is based on a user transaction that was used to generate the user alert trigger. As discussed above, the profile generating circuit 122 may generate user alert triggers by identifying characteristics of certain user transactions that caused the user 110 to depart from the financial guidelines of user 110. For example, the user 110 may have engaged in a transaction for an amount at a merchant that is greater than what the user 110 normally spends at the merchant, so the profile generating circuit 122 may have set certain characteristics (e.g., location) of the transaction as alert triggers. In some embodiments, the financial guideline to which such alert triggers are paired is based on the amount of the transaction. In an example, if the amount of the transaction is above a first threshold but below a second threshold, the alert triggers are paired with at least one short term user financial guideline (e.g., a weekly spending amount on user living expenses). However, if the amount of the transaction is above both the first and second thresholds, the alert triggers may be paired with at least one long term user financial guideline (e.g., a suggested investment amount). This way, triggers associated with larger potential user spending amounts are associated with long term user goals. This may be appropriate, because large deviations from user spending guidelines may have long term consequences for the user 110.

Next, the profile generating circuit 122 may also pair certain user photos with user financial guidelines. In some embodiments, negative user photos are paired with short term user financial goals. For example, the profile generating circuit 122 may select a negative user photograph that was taken after (e.g., but within a certain timing threshold of) a previous user overspending event. To illustrate, a negative user photograph taken within a day of a previous user overspending event may be paired with a user spending trigger associated with merchants at which the user 110 tends to overspend. This way, the user 110 is reminded of how the previous episode of overspending affected them.

In some embodiments, user photos are paired with longer term financial goals of the user (e.g., investment goals) based on the contents of the user photos. For example, a suggested amount that the user 110 should place into a college tuition investment account may be associated with a user photograph containing a child of user 110. In another example, a mortgage payoff goal may be paired with a user photograph containing an image of the home of user 110.

In some embodiments, a single user photograph is paired with every user financial goal. For example, a photograph of the user 110 and the family of user 110 may be paired with each user financial goal. In some embodiments, the user 110 may select a group of photos to be included in the user alerts. For example, the banking client application 118 may present the user 110 with an interface that enables the user 110 to select a photograph to be included in the alert based on the type of alert trigger detected.

In some embodiments, once the user photos are paired with the user financial goals, they are formatted (e.g., compressed) to be included in alerts presented to the user via the methods described herein and stored in association with the paired financial goal or alert trigger such that they are accessible to the banking client application 118. As such, upon detection of the associated alert trigger, an alert trigger including the paired user photograph may be generated and presented to the user 110.

Figure 3:
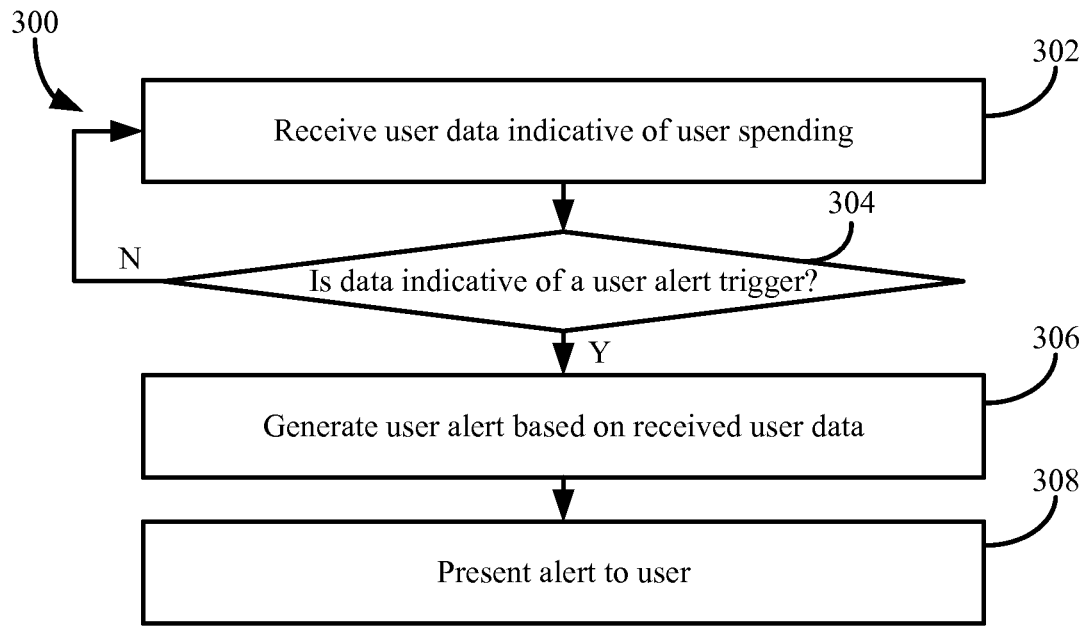
FIG. 3 is a flowchart of a method of providing an alert to a user, according to an example embodiment.

Referring now to FIG. 3, a flow chart of a method 300 of providing a photographic alert to a user 110 is shown, according to an example embodiment. The method 300 may be performed by components of FIG. 1 such that references may be made to one or more components of FIG. 1 to aid the description of the method 300.

At step 302, data indicative of user spending is received. In various embodiments, the user computing device 132 receives data regarding activity of the user 110 from a variety of different sources. In various embodiments, the trigger monitoring circuit 124 may receive information from various items on the user computing device 112. For example, the trigger monitoring circuit 124 may interface with a GPS device on the user computing device 112 to periodically receive information pertaining to the location of the user. Alternatively or additionally, the trigger monitoring circuit 124 may interface with a camera or other imaging device included in the user I/O device 116 to receive user photograph data as photos are captured with the camera. In some embodiments, the trigger monitoring circuit 124 receives data from an accelerometer other sensor on the user computing device 112. For example, the trigger monitoring circuit 124 may receive data from a pedometer application on the user computing device 112 that processes measurements by the accelerometer to generate an indication of the steps of user 110.

In some embodiments, the trigger monitoring circuit 124 receives data generated via various other applications on the user computing device 112. For example, the trigger monitoring circuit 124 may access user social media data input and received by the user 110 via a third party client application 128 on the user computing device 112. The user social media data may include user photograph data (e.g., captured by the user or other individual), user profile information (e.g., information regarding user social media connections, user preferences), and information regarding posts of the user 110. In another example, the trigger monitoring circuit 124 receives information from a calendar application on the user computing device 112 including the timing, location, and descriptions of various user events.

In some embodiments, the trigger monitoring circuit 124 also receives user financial information from the financial institution computing system 142. For example, in some embodiments, the financial institution computing system 142 transmits user financial data (e.g. user account balance information, user transaction data) to the user computing device 112 upon receiving a request from the user 110. In some embodiments, the financial institution computing system 142 periodically (e.g., hourly) transmits such information to user computing device 112. In some embodiments, the trigger monitoring circuit 124 receives information from various other devices associated with the user 110. For example, in some embodiments, the trigger monitoring circuit 124 receives data from an activity tracker that tracks various aspects of the activity level of the user 110 (e.g., steps, heartrate).

At step 304, it is determined if the received data is indicative of a user alert trigger (e.g., a user alert trigger generated via the method 200 discussed above). As discussed herein, user alert triggers may include data descriptive of various aspects of user transactions (e.g., location coordinates associated with a particular merchant, a particular merchant category, a transaction amount at a particular merchant). Additionally, user photograph data associated with various user photos may also be set as user alert triggers. For example, the identity of other individuals included in user photos, the location associated with various user photos, and an activity or action taken by the user 110 or other individual in a photograph may all be established as user alert triggers. In some embodiments, user alert triggers include general alert triggers that are generally indicative of heightened levels of spending such as certain locations where individuals tend to overspend (e.g., restaurants or amusement parks) and certain patterns of transactions (e.g., transactions at a certain frequency).

Accordingly, the trigger monitoring circuit 124 is configured to compare the information received at 302 to the user alert triggers. As such, if the trigger monitoring circuit 124 receives user location data obtained via a GPS device, the trigger monitoring circuit 124 compares the user location data to the various sets of location data in the user alert triggers (e.g., location data associated with merchants at which the user 110 overspends, location data associated with a negative user photo). If the user location data indicates that the location of the user 110 is within a threshold of that of a user alert trigger, the user alert trigger is detected to have occurred and the method advances to the step 306 described below.

In the case that the trigger monitoring circuit 124 receives user photograph data, the trigger monitoring circuit 124 may assess image data associated with the photograph to determine if any alert triggers are present in the photo. For example, the trigger monitoring circuit 124 may identify the emotional state of the user 110 in the photograph (in some embodiments, user emotional states may be set as user alert triggers). Additionally, the trigger monitoring circuit 124 may determine if any individuals other than the user 110 are present in the photograph and, if so, compare the portions of the image to previously taken images of individuals established as user spending triggers. In some embodiments, the trigger monitoring circuit 124 also identifies an activity being performed by the user 110 in the photograph based on certain objects (e.g., held by the user 110, in the scenery around the user, etc.) and determines if the activity has been established as a user alert trigger.

Additionally, data from third party applications 118 on the user computing device 112 may also be assessed for user alert triggers. For example, data received from a calendar application on the user computing device 112 may be assessed to determine if any upcoming user events are at a location or with individuals that have been established as user alert triggers. User social media posts may also be assessed for user emotional states, events with other individuals, and indications of user activities that may be user alert triggers. In various embodiments, if none of the data received at 302 is indicative of any of the user alert triggers, the method 300 reverts back to step 302 and the user computing device 112 continues to monitor the user data.

At step 306, if the received data is determined to be indicative of a user alert trigger, a user alert is generated. In various embodiments, the user alert includes at least one of a reminder of a user financial goal or obligation and a user photo. In some embodiments, the user alert includes only a user photo. The user photograph may include one of the user photos categorized at step 208 of the method 200 discussed above. As discussed above, upon the categorization of user photos, the photos may be formatted for presentation to the user in user alerts and stored in association with the banking client application 118 on the user computing device 112.

Accordingly, upon detection of a user alert trigger, the alert circuit 126 may cause a processor of the user computing device 112 to retrieve one of the categorized photos for presentation to the user 110 via an alert. In some situations, the alert circuit 126 retrieves either a positive user photograph (e.g., a photograph categorized as being associated with a positive emotional state during the step 208) at random in response to the detection of certain user alert triggers. For example, if the detected user alert trigger relates to the emotional state of the user 110 (e.g., the user 110 has taken a photograph in which the user 110 is in a negative emotional state), a positive user photograph may be retrieved an presented to the user 110 via a user alert in an effort to cheer the user up. In some embodiments, the alert circuit 126 may also retrieve a positive user photograph in response to detecting user transactions in certain categories. For example, in response to the user 110 engaging in a transaction at a merchant in one of a subset of categories (e.g., mechanics, healthcare), a positive photograph may be presented to the user 110 to cheer the user 110 up after unavoidable spending.

In some embodiments, the alert circuit 126 retrieves a negative photograph (e.g., a photograph categorized as being associated with a negative emotional state during the step 208) in an effort to prevent certain forms of user spending. For example, upon detection of a user alert trigger that is an indicator of user overspending (e.g., the user 110 being at a certain location, or the user 110 being with another individual), the alert circuit 126 may retrieve a negative user photograph determined to have been captured after a previous episode of user overspending (e.g., a negative user photograph correlated with a user overspending transaction at the step 212 of the method 200 discussed above). As a result, the user 110 is reminded of how overspending makes them feel, and may be prevented from overspending again.

In some embodiments, the alert circuit 126 is configured to generate a user alert that contains both a user financial goal (e.g., a user budget, an investment goal, etc.) as well as a user photo. In some embodiments, the particular user financial goal to be presented to the user in the alert is dependent on the detected alert trigger. In such embodiments, the alert circuit 126 may generate an alert that contains a user financial goal that is paired with the detected alert trigger at step 218 of the method 200 discussed above. The alert may contain a description of the user financial goal (e.g., a budget, a target investment amount, a mortgage payoff amount, etc.) as well as a level of user spending. Additionally, the alert circuit 126 may retrieve the user photograph that was paired with the user financial goal at the step 218 discussed above. As a result the user 110 is presented with a description of a financial goal as well as a user photograph to remind the user 110 of the importance of the financial goal.

In various embodiments, the alert circuit 126 is configured to vary the alerts presented to the user 110. Accordingly, the particular financial goal and/or user photograph to be included in the alert presented to the user 110 may be selected based at least in part on the photos and financial goals presented in previous user alerts. For example, upon detection of a user alert trigger associated with a short term user financial goal, the alert circuit 126 may access a data log that includes a history describing the alerts previously presented to the user. If the data log indicates that the last short term user alert presented to the user 110 includes a first short term financial goal (e.g., a weekly living expenses budget), the alert circuit may generate an alert that presents a second short term financial goal (e.g., a monthly rental payment) to the user 110. A similar process may be utilized to ensure that the user alerts do not repetitively present the same user photos to the user.

At step 308, the alert is presented to the user 110. In an embodiment, the alert is presented to the user 110 as a graphical user interface on a display device of the user computing device 112. In some embodiments, a push notification is generated, transmitted to various other user devices over the network 150, and presented to the user 110 via various other applications associated with the financial institution 140 on the other user devices. This way, even if the user 110 does not have the user computing device 112 with them, the user 110 is presented with the alert.

Figure 4:
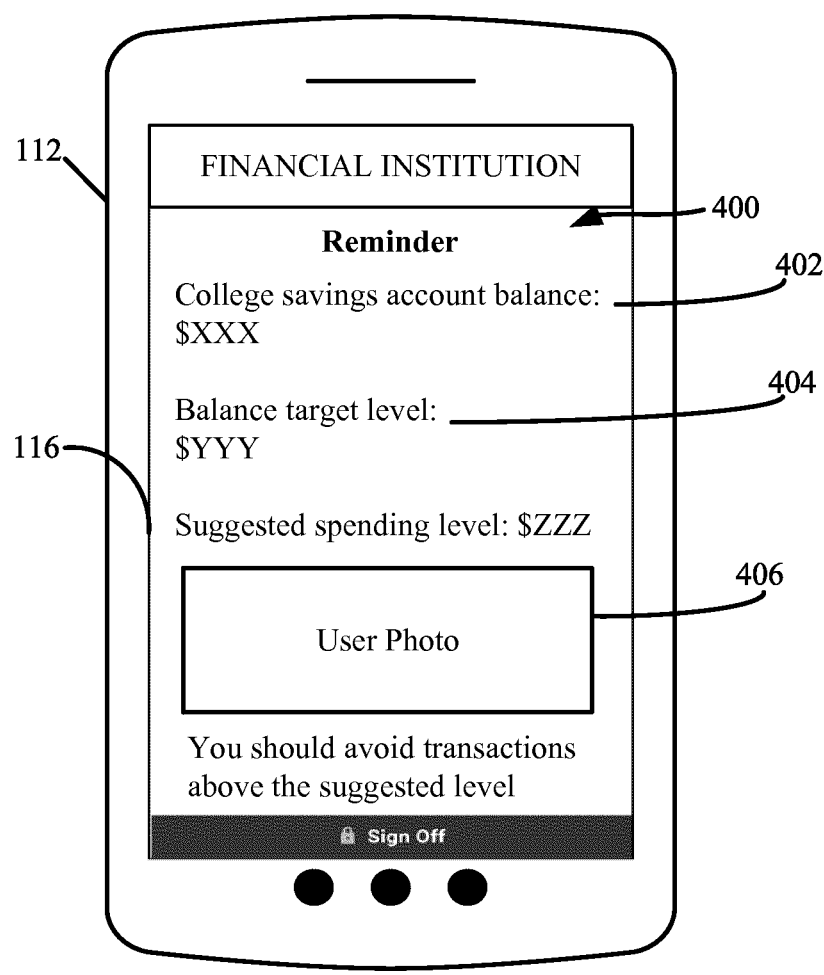
FIG. 4 is an exemplary user alert interface, according to an example embodiment.

Referring now to FIG. 4, an alert interface 400 is shown, according to an example embodiment. In various embodiments, the interface 400 may be presented to the user 110 responsive to a user alert trigger being detected by the methods described herein. In the example shown, the interface 400 is presented to the user 110 on a display device of the user I/O device 116 of the user computing device 112.

The alert interface 400 includes a reminder 402 of a user financial goal, user target levels 404, and a user photograph 406. The reminder 402 includes a description of a user financial goal. In various embodiments, the particular user financial goal described may vary depending on the detected user alert trigger. In the example shown, user financial goal described by the reminder 402 is a long term user financial goal (a college savings account balance). As such, the particular user alert trigger that was detected (e.g., via the method 300 discussed above) to bring about the presentation of the alert interface 400 may have been previously paired with the long term financial goal (e.g., at step 218 of the method 200 discussed above).

The user target levels 404 includes a first user target level related to the user financial goal (e.g., a target account balance) and a second user target level providing a suggested spending level to the user. The alert circuit 126 may calculate the suggested spending level based on user account balance information (e.g., received from the financial institution computing system 142) and the financial guidelines generated during the method 200 discussed above. As such, not only is the user 110 reminded of a financial goal that will be adversely impacted by user overspending, the user 110 is also provided guidance as to how much is to be spent.

The user photograph 406 may be a previous photograph of the user 110. In some embodiments, the user photograph 406 may bear a relationship to the financial goal described by the reminder 402. In the example shown, the user photograph 406 may include a picture of a child of the user 110. This way, the photograph reinforces the reminder 402. In some embodiments, the user photograph 406 is a photograph classified as a negative user photograph (e.g., a photograph determined to be indicative of a negative user emotional state at the step 208 discussed above). In some embodiments, the timing of the negative user photograph bears a relationship to a previous episode of negative user spending (e.g., where the user 110 departed from a budget). As a result, the user 110 is reminded of how previous overspending events make them feel.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U. S. C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A user computing device, comprising:
   a network interface configured to communicate data over a network with a financial institution computing system associated with a financial institution;
   an input/output ("I/O") device configured to exchange data with a user, the I/O device including a display device configured to present a graphical user interface to the user;
   an imaging device configured to generate image data; and
   a processing circuit comprising a memory and a processor, the memory configured to store instructions that, when executed by the processor, cause the processor to:
   receive a baseline user image;
   receive user photograph data including a set of user photographs and photograph metadata associated with each of the photographs in the set of user photographs;
   compare each of the photographs in the set of user photographs with the baseline user image;
   determine an emotive state of the user in each of the photographs in the set of user photographs based on the comparison;
   categorize each of the photographs based on the determined emotive states of the user, each of the photographs categorized into at least a user positive emotion category and a user negative emotion category;
   receive, by at least one of the network interface, I/O device, and the imaging device, spending behavior data indicative of a spending behavior of the user;
   generate a user spending alert based on the received spending behavior data and a determined emotive state of the user in relation to the spending behavior data, wherein the user spending alert includes a photograph from the set of user photographs categorized within the user positive emotion category; and
   present, via the display device, the user spending alert to the user.

2. The computing device of claim 1, wherein the instructions further cause the processor to:
   receive, via the I/O device, an input from the user to access the user photograph data.

3. The computing device of claim 2, wherein the instructions further cause the processor to:
   receive, via the network interface, user transaction data from the financial institution computing system, the user transaction data descriptive of a set of user transactions that occurred at a plurality of times; and
   correlate the set of user transactions with the photograph metadata to associate photographs in the set of user photographs to transactions in the set of transactions.

4. The computing device of claim 3, wherein the instructions further cause the processor to:
   categorize a transaction in the set of transactions as a negative transaction if the transaction is associated with a photograph in the set of user photographs categorized within the user negative emotion category; and
   categorize a transaction in the set of transactions as a positive transaction if the transaction was associated with a photograph in the set of user photographs categorized within the user positive emotion category.

5. The computing device of claim 4, wherein a plurality of user transactions in the set of user transactions are correlated with the photograph metadata, associated with a plurality of photographs in the set of user photographs, and categorized as positive or negative transactions.

6. The computing device of claim 5, wherein the received spending behavior data comprises user transaction data received via the network interface from the financial institution computing system, wherein the instructions further cause the processor to determine that the user transaction data includes at least one characteristic shared with a previous user transaction identified as a negative transaction.

7. The computing device of claim 5, wherein the instructions further cause the processor to generate a set of user spending triggers based on the transaction data describing the categorized transactions, wherein the set of user spending triggers includes at least one of a location, image data associated with another individual, a timing, or a merchant category.

8. The computing device of claim 7, wherein the instructions further cause the processor to compare the received spending behavior to the set of user spending triggers to determine that the received data indicative of the user spending behavior is indicative of a user spending trigger, wherein the generation of the user spending alert occurs responsive to the determination that the data indicative of the user spending behavior is indicative of the user spending trigger.

9. The computing device of claim 8, wherein generating the user spending alert includes:
   associating a user spending trigger with a user financial goal; and retrieving the user photograph based on the user spending goal.

10. A computer-implemented method, comprising:
receiving, by a mobile device associated with a user, a baseline user image;
receiving, by the mobile device, user photograph data including a set of user photographs and photograph metadata associated with each of the photographs in the set of user photographs;
comparing, by the mobile device, each of the photographs in the set of user photographs with the baseline user image;
determining, by the mobile device, an emotive state of the user in each of the photographs in the set of user photographs based on the comparison;
categorizing, by the mobile device, each of the photographs based on the determined emotive states of the user, each of the photographs categorized into at least a user positive emotion category and a user negative emotion category;
receiving, by the mobile device, spending behavior data indicative of spending behavior of the user;
generating, by the mobile device, a user spending alert based on the received spending behavior data and a determined emotive state of the user in relation to the spending behavior data, wherein the user spending alert includes a photograph from the set of user photographs categorized within the user positive emotion category; and
presenting, via a display device of the mobile device, the user spending alert to the user.

11. The method of claim 10, further comprising:
receiving, by the mobile device, an input from the user to access user the photograph data.

12. The method of claim 11, further comprising:
receiving, by the mobile device, user transaction data from the financial institution computing system, the user transaction data descriptive of a set of user transactions that occurred at a plurality of times; and
correlating, by the mobile device, the set of user transactions with the photograph metadata to associate photographs in the set of user photographs to transactions in the set of transactions.

13. The method of claim 12, further comprising:
categorizing, by the mobile device, a transaction in the set of transactions as a negative transaction if the transaction is associated with a photograph in the set of user photographs categorized within the user negative emotion category; and
categorizing, by the mobile device, a transaction in the set of transactions as a positive transaction if the transaction is associated with a photograph in the set of photographs categorized within the user positive emotion category.

14. The method of claim 13, wherein the received spending behavior data comprises user transaction data received from a financial institution computing system, wherein the instructions further cause the processor to determine that the user transaction data includes at least one characteristic shared with a previous user transaction categorized as a user negative transaction.

15. The method of claim 13, further comprising generating, by the mobile device, a set of user spending triggers based on the transaction data describing the categorized transactions, wherein the set of user spending triggers includes at least one of a location, image data associated with another individual, a timing, or a merchant category.

16. The method of claim 15, further comprising comparing, by the mobile device, the received spending behavior data to the set of user spending triggers to determine that the received data indicative of the user spending behavior is indicative of a user spending trigger, wherein the generation of the user spending alert occurs responsive to the determination that the data indicative of the user spending behavior is indicative of the user spending trigger.

17. A non-transitory computer readable media having computer-executable instructions embodied therein that, when executed by a processor of a user computing device associated with a user, causes the user computing device to perform operations to provide an alert to the user, the operations comprising:
receiving, by the user computing device, a baseline user image;
receiving, by the user computing device, user photograph data including a set of user photographs and photograph metadata associated with each of the photographs in the set of user photographs;
comparing, by the user computing device, each of the photographs in the set of user photographs with the baseline user image;
determining, by the user computing device, an emotive state of the user in each of the photographs in the set of user photographs based on the comparison;
categorizing, by the user computing device, each of the photographs based on the determined emotive states of the user, each of the photographs categorized into at least a user positive emotion category and a user negative emotion category;
receiving, by the user computing device, spending behavior data indicative of a spending behavior of the user;
generating, by the user computing device, a user spending alert based on the received spending behavior data and a determined emotive state of the user in relation to the spending behavior data, wherein the user spending alert includes a photograph from the set of user photographs categorized within the user positive emotion category; and
presenting, via a display device of the user computing device, the user spending alert to the user.

18. The non-transitory computer-readable media of claim 17, the operations further comprising:
receiving an input from the user to access the user photograph data.

* * * * *